(12) United States Patent
Rapanen

(10) Patent No.: US 9,451,430 B2
(45) Date of Patent: Sep. 20, 2016

(54) DELIVERY OF MESSAGES IN MOBILE COMMUNICATION NETWORK

(71) Applicant: TeliaSonera AB, Stockholm (SE)

(72) Inventor: Joni Rapanen, Espoo (FI)

(73) Assignee: TELIA COMPANY AB, Stockholm (SE)

( * ) Notice: Subject to any disclaimer, the term of this patent is extended or adjusted under 35 U.S.C. 154(b) by 0 days.

(21) Appl. No.: 14/661,003

(22) Filed: Mar. 18, 2015

(65) Prior Publication Data

US 2015/0271652 A1    Sep. 24, 2015

(30) Foreign Application Priority Data

Mar. 18, 2014   (FI) ..................... 20145248

(51) Int. Cl.
| | |
|---|---|
| H04W 4/00 | (2009.01) |
| H04W 4/14 | (2009.01) |
| H04L 1/16 | (2006.01) |
| H04L 12/58 | (2006.01) |

(52) U.S. Cl.
CPC ............... *H04W 4/14* (2013.01); *H04L 1/16* (2013.01); *H04L 51/30* (2013.01); *H04L 51/38* (2013.01)

(58) Field of Classification Search
CPC ........ H04W 4/14; H04L 51/30; H04L 51/38; H04L 1/16
USPC ......................................... 455/466
See application file for complete search history.

(56) References Cited

U.S. PATENT DOCUMENTS 6,424,841 B1    7/2002    Gustafsson

| | | | |
|---|---|---|---|
| 2010/0210292 A1* | 8/2010 | Nooren | H04W 4/14 455/466 |
| 2013/0115982 A1* | 5/2013 | Stojanovski | H04L 12/5875 455/466 |
| 2014/0179359 A1* | 6/2014 | Wijbrans | H04W 4/14 455/466 |

FOREIGN PATENT DOCUMENTS

| | | |
|---|---|---|
| WO | 03063528 A2 | 7/2003 |
| WO | 2009-146743 | 12/2009 |
| WO | 2012004780 A1 | 1/2012 |

OTHER PUBLICATIONS

ETSI TS 129 311 V8 (Oct. 2011); Universal Mobile Telecommunications System (UMTS); LTE;Service level interworking for Messaging Services (3GPP TS 29.311 version 8.2.0 Release 8); ETSI 650 Route des Lucioles F-06921 Sophia Antipolis Cedex—France Oct. 2011 Chapter 1 ; p. 18 paragraphs 2-3.
FR Search Report, dated Oct. 2, 2014, from corresponding FR application.
European search report, dated Sep. 9, 2015; Application No. 15 15 8325.

* cited by examiner

*Primary Examiner* — Juan A Torres
(74) *Attorney, Agent, or Firm* — Young & Thompson

(57) ABSTRACT

A method for delivering data in at least two short messages being concatenated to each other wherein a short message is delivered from an originating party to a destination party through a short message service center, an acknowledgement indicating a successful delivery of the delivered short message is received by the originating party from the short message center, and in response to the receipt of the acknowledgement indicating a successful delivery of the previous short message, at least one other short message is delivered to the destination party. A server implementing at least part of the method steps is also described.

2 Claims, 2 Drawing Sheets

1

DELIVERY OF MESSAGES IN MOBILE COMMUNICATION NETWORK

TECHNICAL FIELD

The invention concerns in general the technical field of communication over mobile communication network. Especially the invention concerns communication through a messaging service in the mobile communication network.

BACKGROUND OF THE INVENTION

Short message service (SMS) is the most known messaging service in the mobile communication network. It has gained the popularity because of its simplicity to use and there is no need to any specific applications as such in the terminal side nor in the network side, as the SMS is carried from the originator to the destination by using the Mobile Application Part (MAP) of the SS#7 protocol, wherein the Short Message protocol elements are transported across the network as fields within the MAP messages.

Originally it was possible to transmit short messages with 160 characters, but later it became possible to deliver short messages with more than 160 characters. In such a situation the short message exceeding the 160 characters is divided into multiple short messages and each of the messages are transmitted separately and combined in the destination address back to a one short message again. In other words, the data exceeding the 160 characters is sent using multiple messages, in which case each message will start with a User Data Header (UDH) containing segmentation information. The segmentation information comprises three parameters: Reference number, Maximum number and Sequence number. The Reference number identifies the short message in question, Maximum number identifies the number of concatenated messages related to each other and Sequence number defines the order of the message in the sequence. The Reference number is the same in each of the messages belonging to the same short message packet. Generally speaking, the UDH is part of the payload and thus the number of available characters per segment is lower: 153 for 7-bit encoding, 134 for 8-bit encoding and 67 for 16-bit encoding.

A challenge with the above described situation in which one message is divided into multiple messages i.e. concatenated is that there is a risk that the messages, or only some of them, get queued in the network. The reason for this may be that one or more network elements involved in the delivery of the message may be congested. For example, when the short messages are originating from some network element, e.g. a server, and transmitted from there to short message service center (SMSC), the latter parts of the messages are very likely to get queued because the delivery path is slower from SMSC to a user terminal and back than from the source to the SMSC. The queuing of the messages in the SMSC may cause the start of so called resend schedule of the messages, as the source does not receive any acknowledgement of the delivery of messages in due course. The resend schedule is operator definable, but may e.g. be such that the first resend happens after 10 seconds after the delivery of the first message if no acknowledgement is received. The second resend happens in 10 seconds on the same grounds with respect to the first resent message. The next resend may e.g. be scheduled in 30 seconds from non-acknowledged second resent message, and so on. Thus, one can see from above that the described mechanism to transmit the messages is not acceptable especially in view of applications in which the delivery time plays an important role. Such applications may e.g. be authentication related services, wherein the user of a user terminal needs some authentication information immediately when using a certain service.

Thus, some improved mechanisms are needed to solve the above described situations.

SUMMARY OF THE INVENTION

An objective of the invention is to present a method and a server for delivering messages at least partly in a mobile communication network. Another objective of the invention is that the method and the server for delivering the messages mitigate the delivery time challenges of concatenated messages.

The objects of the invention are reached by a method and a server as defined by the respective independent claims.

According to a first aspect, a method for delivering data in at least two short messages being concatenated to each other is provided, the method comprising delivering a short message from an originating party to a destination party through a short message service center; receiving, by the originating party, an acknowledgement indicating a successful delivery of the delivered short message from the short message center; and delivering, in response to the receipt of the acknowledgement indicating a successful delivery of the previous short message, at least one other short message to the destination party.

According to a second aspect, a server for delivering data in at least two short messages being concatenated to each other is provided, the server comprises a processing unit, a memory unit storing portions of computer program code, wherein by executing at least part of the portions of the computer program code by the processing unit the server is caused to: deliver a short message from the server to a destination party through a short message service center; receive an acknowledgement indicating a successful delivery of the delivered short message from the short message center; and deliver, in response to the receipt of the acknowledgement indicating a successful delivery of the previous short message, at least one other short message to the destination party.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
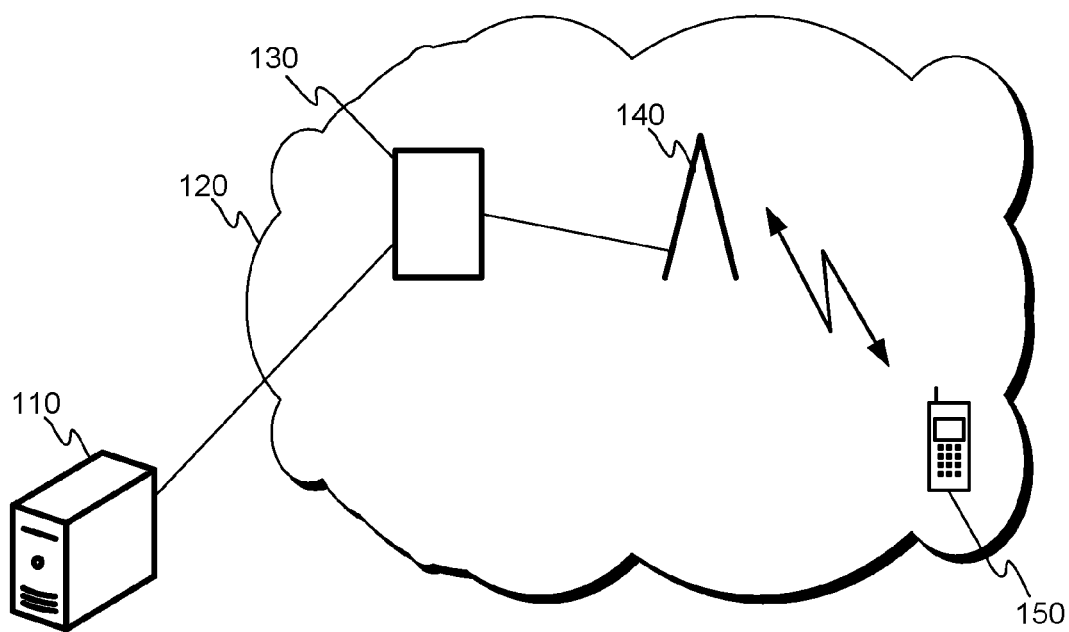
FIG. 1 illustrates a network environment into which the present invention may be implemented.

FIG. 1 illustrates a network environment into which the present invention may be implemented. The environment may comprise one or more servers 110 arranged to prove services to customers in one or more mobile communication networks 120. The one or more servers 110 may reside in a mobile communication network 120 or be external to the mobile communication networks 120, but a communication channel is arranged between the servers 110 and at least one network element in the mobile communication network 120. The present invention is especially applicable in a situation in which the server 110 is arranged to provide certain service to customers, such as to mobile user terminals residing in the network 120 or some other network elements, and the communication between the server 110 and the customer, such as a user terminal 150 is arranged through messaging, such as through short message service.

Next, an example of the invention is described in such as a case that the communication is happening between a server 110 and a user terminal 150 over a short message service. In such case the user terminal 150 may, or may not, have initiated an inquiry to the server 110 in any manner. The server 110 is arranged, either in response to the inquiry or on its own, to deliver data to the customer. The amount of data is such that it shall be divided in to multiple concatenated short messages according to short message specification. The short messages are delivered from the server 110 to a short message service center 130, which is a network element in the mobile communication network 120. The function of the short message service center 130 is to store, forward, convert and deliver SMS messages. The short message service center 130 is configured to determine, among other procedural steps, a location of the user terminal 150 terminating the SMS and arrange the delivery of SMS to the user terminal 150 through a base station 140 serving the user terminal 150 at the time of delivery. Here it is not described the full delivery procedure of a SMS, since it is commonly known and standardized mechanism. There are many more network elements involved in the delivery than depicted in FIG. 1 and in the description herein.

As mentioned above the situation is that the amount of data to be delivered through the above described mechanism exceeds 160 characters, which is s the amount which can be included in one SMS. In such a situation multiple concatenated short messages are created. According to the present invention, in order to mitigate the risk of queuing the short messages e.g. in the short message service center 130 and thus ending up to resend scheduling, the idea is to hold the delivery of any latter message so that it can be confirmed that the previous short message has reached the target before delivering any latter messages belonging to the same packet. This can be arranged so that the source, i.e. the server 110, is configured to wait a delivery receipt message from the short message center 130 before initiating the delivery of any latter messages. In practice, this may be arranged so that when the short message service center 130 receives an acknowledgement of the delivery of the first SMS belonging to the short message packet to be delivered, it composes an acknowledgement to the server 110 and the server 110 initiates the delivery of the next short message belonging to the short message packet to be delivered. When the last short message belonging to the short message packet to be delivered reaches the user terminal 150, the user terminal 150, or an application therein, is configured to compose the original data from the concatenated short messages. As mentioned, each of the messages contains a User Data Header comprising segmentation information, which is used when reassembling the messages into one long message. The segmentation information is added to the messages in the transmitting end and read in the receiving end. The segmentation information comprises the Reference number, the Maximum number and the Sequence number, as already mentioned.

Figure 2:
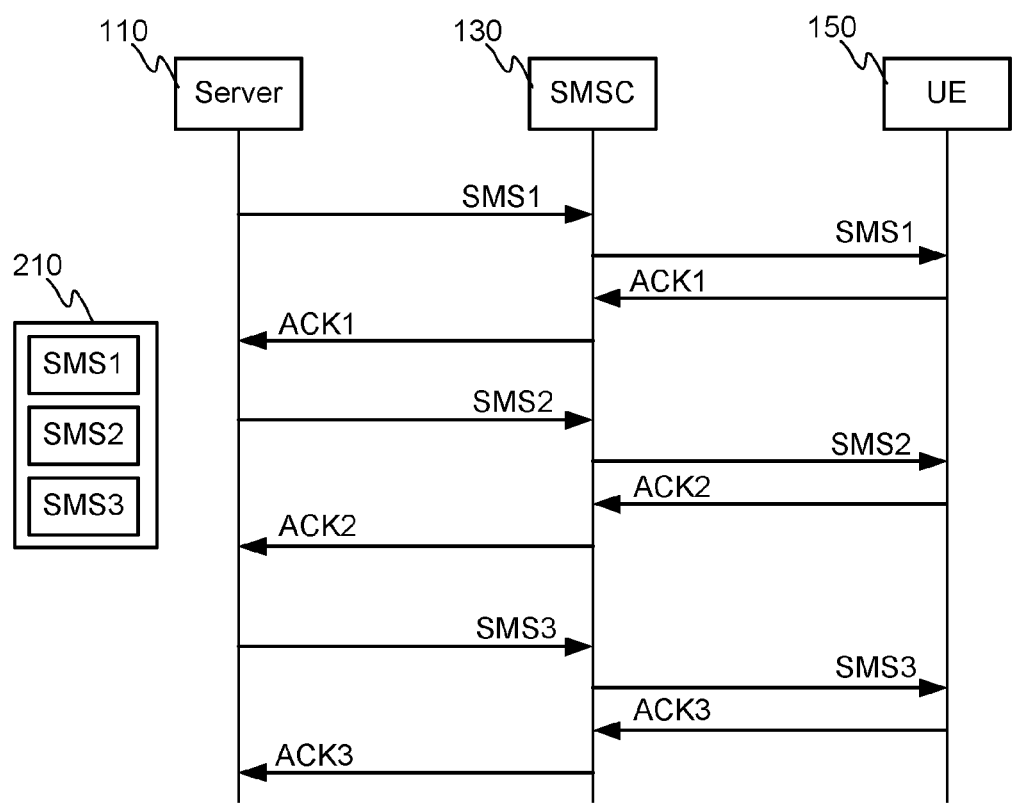
FIG. 2 illustrates a message flow diagram according to an example of the invention.

The method according to the present invention is now shortly described with a message flow diagram of FIG. 2 in a situation in which three short messages SMS1, SMS2, SMS3 belong to a short message packet 210 to be delivered. In other words, the data to be delivered comprises more than 320 characters (>2×160 characters). The server is configured to send the first message SMS1, which is delivered to the user terminal 150 through a SMSC 130. The user terminal 150 acknowledges the receipt to SMSC 130, which in turn acknowledges the successful delivery of the first SMS, i.e. SMS1, to the server 110. This triggers the sending of the second short message SMS2 and the same acknowledgement procedure happens as regards the SMS2. The acknowledgement of the delivery of SMS2 triggers again the sending of the third short message SMS3 and when the delivery of the last short message is acknowledged, the procedure ends. The procedure as described differs from the state of the art solution in a sense that the messages are not send at the same time and the delivery of messages are dependent on the delivery of at least one other message, which is not the case with the state of the art solutions.

Figure 3:
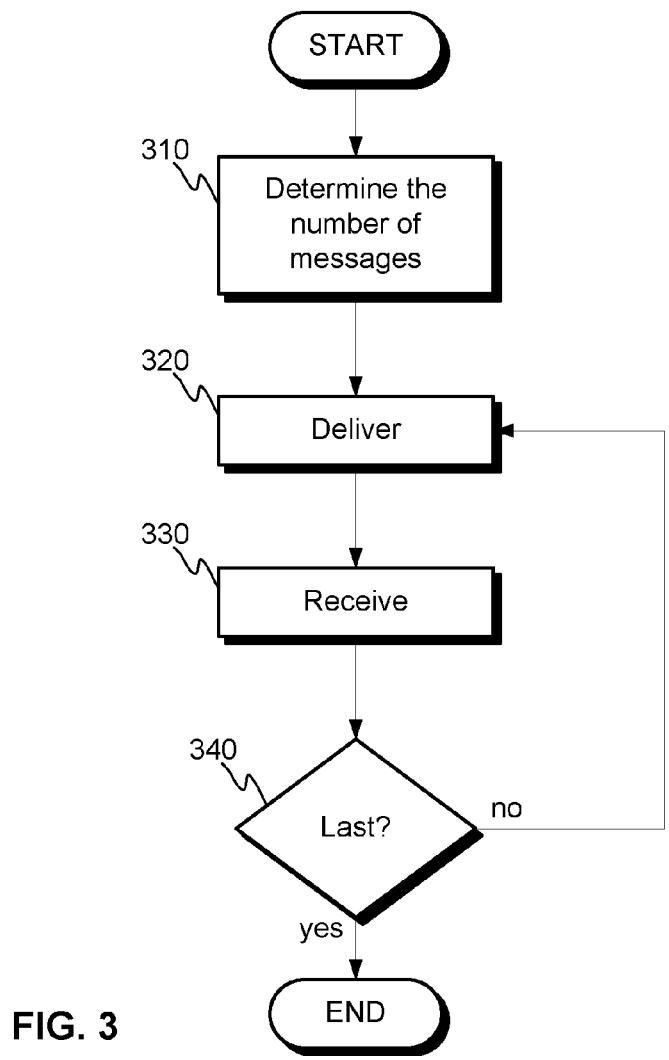
FIG. 3 illustrates an example of the method according to the invention.

An example of the method according to the invention, as seen in the server i.e. originating party, is illustrated in FIG. 3. The method starts by determining 310 how many short messages shall be delivered. In other words, there is an amount of data, which is to be delivered with short messages of 160 characters from the originating party to the destination party. The number of short messages may simply be defined mathematically by calculating, how many short messages of 160 characters are needed to carry the data of predetermined amount of characters. In response to the determination 310, a first short message is delivered 320 and the originating party is set to a state of waiting for a receipt of successful delivery of the first short message. In response to a receipt of acknowledgement 330 of the delivery, it is checked 340 if the sent short message was the last. If yes, the procedure is discontinued. If not, the next short message is delivered 320 and the procedure continues as long as the last concatenated message is delivered.

Figure 4:
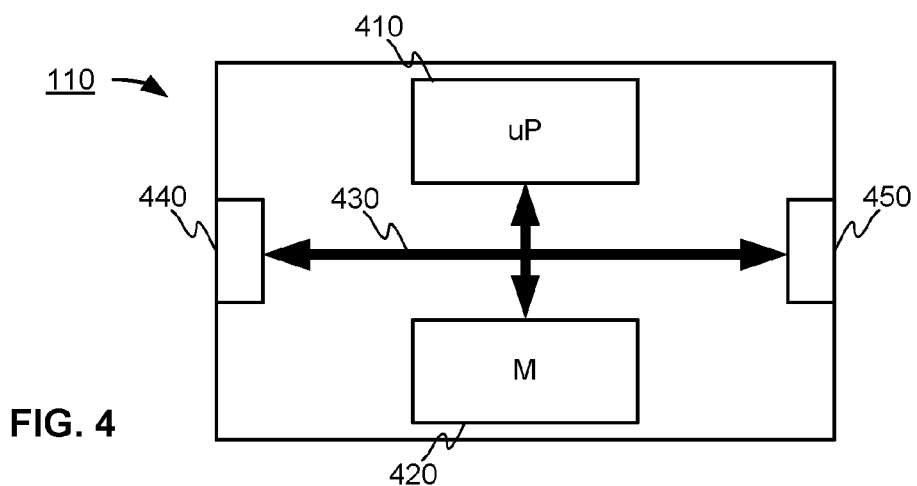
FIG. 4 illustrates an example of a network element implementing at least part of the method according to the invention.

The originating party may e.g. be a server 110, as illustrated in FIG. 4, comprising a processing unit 410 of one or more processors, a memory unit 420 of one or more memories and necessary interfaces in order to communicate between the processor unit and memory unit, but also with any external entities, such as a mobile communication network. The internal communication can be arranged through a data bus 430, for example. The external communication can be arranged through necessary modems 440 either for wired or wireless communication or both of these. The memory unit is configured to store portions of computer program code, which when executed by the processing unit, may cause the server 110 to implement the method according to the invention. Moreover, the server may comprise I/O means 450, such as keyboard, mouse, display device or any similar implemented either directly in the server or coupled to it.

The present invention relates also to a computer program product configured to, when executed in the server, to cause the server to implement at least part of the method steps as described in the description above.

In the description above it is used a term SMS packet or concatenated messages. Both of these refer to a situation in which the amount of data is such that the data is to be divided into multiple short messages, which are in relation to each other. The relation may e.g. be indicated with some identifier inserted in a specific data field in each of the related messages so that the data can be composed from multiple short messages in the destination address.

One application area for the present invention may e.g. be so called authentication services. Therein mobile signature service uses secure element on SIM card and MSSP (Mobile Signature Services Server) infrastructure to provide WPKI (Wireless Public Key Infrastructure) services to customers. Within this service there are two major events:
1. PKI Key pair registration process where encryption keys are send over the SMS channel, and
2. Authentication/Text signing where hash or authentication digest is sent to secure element for digital signing.

Now there are security related needs to start using even longer keys and digests/hashs.

One SMS can carry maximum of 1120 bits of data, which means that 7 bits is reserved per character. Now, if there is need to use for example 2048 bit long RSA keys, the server needs to make concatenated message train according to the present invention to pass this through from the server to the user terminal and thus to the secure element on SIM card.

Even if in the above description it is disclosed that the communication is from a server to a user terminal, the originating party and the destination party may be any other, e.g. both are servers or mobile terminals or any combination of these as long as the communication is, at least partly, happening over short messages.

Some advantageous embodiments according to the invention were described above. The invention is not limited to the embodiments described. The inventive idea can be applied in numerous ways within the scope defined by the claims attached hereto.

The invention claimed is:

1. A method for delivering data in at least two short messages being concatenated to each other, the method comprising:
    delivering a short message from an originating party to a destination party through a short message service center,
    receiving, by the originating party, an acknowledgement indicating a successful delivery of the delivered short message from the short message center, wherein the acknowledgement is transmitted by the short message center in response to a receipt of acknowledgement received from the destination party indicating a successful delivery of the delivered short message to the destination party, and
    delivering, in response to the receipt of the acknowledgement indicating a successful delivery of the previous short message, at least one other short message to the destination party through the short message service center.

2. A server for delivering data in at least two short messages being concatenated to each other, the server comprising:
    a processing unit; and
    a memory unit storing portions of computer program code;
    wherein by executing at least part of the portions of the computer program code by the processing unit the server is caused to:
    deliver a short message from the server to a destination party through a short message service center,
    receive an acknowledgement indicating a successful delivery of the delivered short message from the short message center, wherein the acknowledgement is transmitted by the short message center in response to a receipt of acknowledgement received from the destination party indicating a successful delivery of the delivered short message to the destination party, and
    deliver, in response to the receipt of the acknowledgement indicating a successful delivery of the previous short message, at least one other short message to the destination party through the short message service center.

* * * * *